US012780701B2

(12) United States Patent
Wilson

(10) Patent No.: US 12,780,701 B2
(45) **Date of Patent: *Nov. 3, 2026**

(54) WATER SUPPLY SYSTEM INCLUDING CHLORINATION TREATMENT AND CONTROL

(71) Applicant: Angel Water, Inc., Barrington, IL (US)

(72) Inventor: Andrew J. Wilson, Barrington, IL (US)

(73) Assignee: Angel Water, Inc., Barrington, IL (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/652,413

(22) Filed: May 1, 2024

(65) Prior Publication Data

US 2024/0279090 A1 Aug. 22, 2024

Related U.S. Application Data

(63) Continuation of application No. 16/564,250, filed on Sep. 9, 2019, now Pat. No. 11,999,639, which is a (Continued)

(51) Int. Cl.
*C02F 1/76* (2023.01)
*C02F 1/00* (2023.01)

(52) U.S. Cl.
CPC ................ *C02F 1/76* (2013.01); *C02F 1/008* (2013.01); *C02F 2201/005* (2013.01); *C02F 2209/03* (2013.01)

(58) Field of Classification Search
CPC ...... C02F 1/76; C02F 1/008; C02F 2201/005; C02F 2209/03; C02F 2209/008;
(Continued)

(56) References Cited

U.S. PATENT DOCUMENTS 3,627,133 A * 12/1971 Rak ....................... C02F 1/4674 210/140
4,511,258 A 4/1985 Federighi
(Continued)

FOREIGN PATENT DOCUMENTS

CA 2317729 C 7/2006
KR 20110004235 A * 1/2011 ................ C02F 1/50

OTHER PUBLICATIONS

KR20110004235 Yang et al.—Liquid chlorine injection device using AI (Machine Translation & Abstract; Jan. 13, 2011) (Year: 2011).*
(Continued)

*Primary Examiner* — Hayden Brewster
(74) *Attorney, Agent, or Firm* — McDonnell Boehnen Hulbert & Berghoff LLP

(57) ABSTRACT

As an example embodiment, a system may detect water flow in a well water system and may responsively trigger a pump to inject a chlorinating substance into untreated water from the well. Further, the system may include a contact reservoir that allows the water and the chlorinating substance to combine. In this way, the chlorinating substance is drawn only when needed, but is given the opportunity to achieve time in solution with the untreated water. As a result, bacteria in untreated water may be dispatched, while other organic substances in the untreated water are given the opportunity to settle to the bottom of the contact reservoir. A static mixer may be used to mix the chlorinating substance and the untreated water prior to entering the contact reservoir and/or while in the contact reservoir.

20 Claims, 3 Drawing Sheets

Related U.S. Application Data continuation of application No. 13/829,060, filed on Mar. 14, 2013, now Pat. No. 10,501,348.

(58) Field of Classification Search
CPC C02F 2209/40; C02F 2303/185; C02F 1/722; C02F 2303/04
See application file for complete search history.

(56) References Cited

U.S. PATENT DOCUMENTS

| | | | | |
|---|---|---|---|---|
| 4,599,159 | A | 7/1986 | Hilbig | |
| 4,936,689 | A | 6/1990 | Federighi | |
| 5,021,619 | A | 6/1991 | Hutchinson | |
| 5,611,937 | A * | 3/1997 | Jarocki | C02F 1/686 210/764 |
| 5,637,230 | A | 6/1997 | Billings | |
| 6,346,198 | B1 | 2/2002 | Watson | |
| 6,517,713 | B2 | 2/2003 | Gargas | |
| 7,077,967 | B2 | 7/2006 | Perkins | |
| 7,638,063 | B1 | 12/2009 | Maas | |
| 7,751,159 | B2 * | 7/2010 | Koehl | G05B 15/02 318/490 |
| 8,877,067 | B2 | 11/2014 | Sichel | |
| 9,862,619 | B2 | 1/2018 | Hellenbrand | |
| 2002/0189984 | A1 * | 12/2002 | Larkner | C02F 1/008 210/94 |
| 2004/0069719 | A1 * | 4/2004 | Wang | C02F 1/70 210/206 |
| 2004/0211731 | A1 | 10/2004 | Ferguson | |
| 2005/0084411 | A1 | 4/2005 | Childers, II | |
| 2005/0194300 | A1 * | 9/2005 | Zhang | B01F 23/29 210/205 |
| 2005/0218054 | A1 | 10/2005 | Sakata | |
| 2010/0018990 | A1 | 1/2010 | Eklund | |
| 2010/0230365 | A1 * | 9/2010 | Hill | C02F 1/505 210/744 |
| 2011/0047690 | A1 | 3/2011 | Hui | |
| 2011/0094949 | A1 | 4/2011 | Just | |
| 2011/0139701 | A1 | 6/2011 | Pearks | |
| 2012/0039792 | A1 | 2/2012 | Duta | |
| 2012/0285897 | A1 | 11/2012 | Fike | |

OTHER PUBLICATIONS

Angel Water Conditioning, Inc., Chlorine Injection System Manual, allegedly dated Sep. 24, 2009.

"Chlorination System using chlorine injection by a chlorinator pump/ GW Pumps & Purification," https://web.archive.org/web/20120511073913/http://www.gwpumps.com/purifcation/chlorination-system/, Apr. 16, 2020, 2 pages.

"Flow Switch PVC 2 inch," Clean Water Store, http://www.cleanwaterstore.com/X1000170-p-flow-switches.html, Jan. 4, 2011.

"Water Flow Switch", Web page <http://yourwaterneeds.com/WT_flow switch.asp>, 3 pages, Oct. 7, 2011, retrieved from Wayback Machine <http://web.archive.org/web/20111007232626/http://www.yourwaterneeds.com/WT_flowswitch.asp> on Mar. 1, 2022. (Year: 2011), 2 pages.

"Water treatment, Well Water Treatment," https://web.archive.org/web/20111008200553/https://www.yourwaterneeds.com/WT_Well_Water_Installation.asp, Apr. 16, 2020, 2 pages.

"Well Water-Chlorination Systems," https://web.archive.org/web/20120121015902/http://www.glasswatersystems.com/wewasy.html, Apr. 16, 2020, 8 pages.

"Whole House Activated Carbon Water Filters Auto Backwash System", Web page <http://www.yourwaterneeds.com/WC_CarbonPurifiers.asp>, 3 pages, Sep. 3, 2011, retrieved from Wayback Machine <http://web.archive.org/ web/20110903120500/http://www.yourwaterneeds.com/WC_CarbonPurifiers.asp> Mar. 1, 2022 (Year: 2011).

Activated Carbon & Specialty Products, CalgonCarbon, 2013 Calgon Carbon Corporation, 1 page.

Advisory Action mailed Aug. 21, 2017, issued in connection with U.S. Appl. No. 13/829,060, filed Mar. 14, 2013, 4 pages.

Advisory Action mailed Sep. 1, 2016, issued in connection with U.S. Appl. No. 13/829,060, filed Mar. 14, 2013, 3 pages.

Final Office Action mailed Jun. 15, 2016, issued in connection with U.S. Appl. No. 13/829,060, filed Mar. 14, 2013, 11 pages.

Final Office Action mailed May 17, 2017, issued in connection with U.S. Appl. No. 13/829,060, filed Mar. 14, 2013, 18 pages.

Non-Final Office Action mailed Mar. 7, 2022, issued in connection with U.S. Appl. No. 16/989,388, filed Aug. 10, 2020, 13 pages.

Non-Final Office Action mailed Dec. 17, 2015, issued in connection with U.S. Appl. No. 13/829,060, filed Mar. 14, 2013, 11 pages.

Non-Final Office Action mailed Jul. 7, 2015, issued in connection with U.S. Appl. No. 13/829,060, filed Mar. 14, 2013, 11 pages.

Non-Final Office Action mailed Oct. 6, 2016, issued in connection with U.S. Appl. No. 13/829,060, filed Mar. 14, 2013, 16 pages.

Notice of Allowance mailed Aug. 30, 2019, issued in connection with U.S. Appl. No. 13/829,060, filed Mar. 14, 2013, 8 pages.

U.S. Appl. No. 16/564,250, filed Sep. 9, 2019.

U.S. Appl. No. 13/829,060, filed Mar. 14, 2013.

* cited by examiner

WATER SUPPLY SYSTEM INCLUDING CHLORINATION TREATMENT AND CONTROL

CROSS-REFERENCE TO RELATED APPLICATION

This application is a continuation of and claims priority to U.S. patent application Ser. No. 16/564,250, filed Sep. 9, 2019, which is hereby incorporated by reference in its entirety.

U.S. patent application Ser. No. 16/564,250 is a continuation of and claims priority to U.S. patent application Ser. No. 13/829,060, filed Mar. 14, 2013, which is hereby incorporated by reference in its entirety.

BACKGROUND

Many residential and smaller commercial water supply systems draw water from a well. The well may be dug or drilled to access groundwater in underground aquifers. Since well water may be used for drinking, contamination is a concern. Thus, it is desirable to be able to eliminate, reduce, and/or neutralize, bacteria and other potentially harmful organic and/or non-organic substances that may exist in raw, untreated well water. However, doing so efficiently can be challenging.

SUMMARY

The embodiments herein disclose a system that may detect water flow in a well water system and responsively trigger a pump to inject a chlorinating substance into untreated water from the well. Further, the system may include a contact reservoir that allows the water and the chlorinating substance to combine. In this way, the chlorinating substance is drawn only when needed, but is given the opportunity to achieve time in solution with the untreated water. As a result, bacteria in untreated water may be dispatched, while other organic substances in the untreated water are given the opportunity to settle to the bottom of the contact reservoir. In some embodiments, a static mixer may be used to mix the chlorinating substance and the untreated water prior to entering the contact reservoir and/or while in the contact reservoir.

The system may further include a de-chlorinator that receives chlorinated water from the contact reservoir, and removes at least some of the chlorinating substance from the water. The de-chlorinator may provide the resulting treated water to a water distribution system in a residence or small business. The treated water may be suitable for drinking, cooking, washing, and/or other household uses. In some cases, the water flow may be detected by a flow valve that is coupled to the de-chlorinator.

Accordingly, in an example embodiment, a pump may be configured to inject a chlorinating substance into water when triggered. A contact reservoir may be configured to receive the water and the chlorinating substance. Further, a flow valve may be configured to sense a flow of the water, and configured to responsively trigger the pump to inject the chlorinating substance into the water.

In another example embodiment, a flow valve may sense a flow of water. In response to sensing the flow of water, a pump may be triggered, perhaps by the flow valve, to inject a chlorinating substance into the flow of water. A contact reservoir may receive the water and the chlorinating substance.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
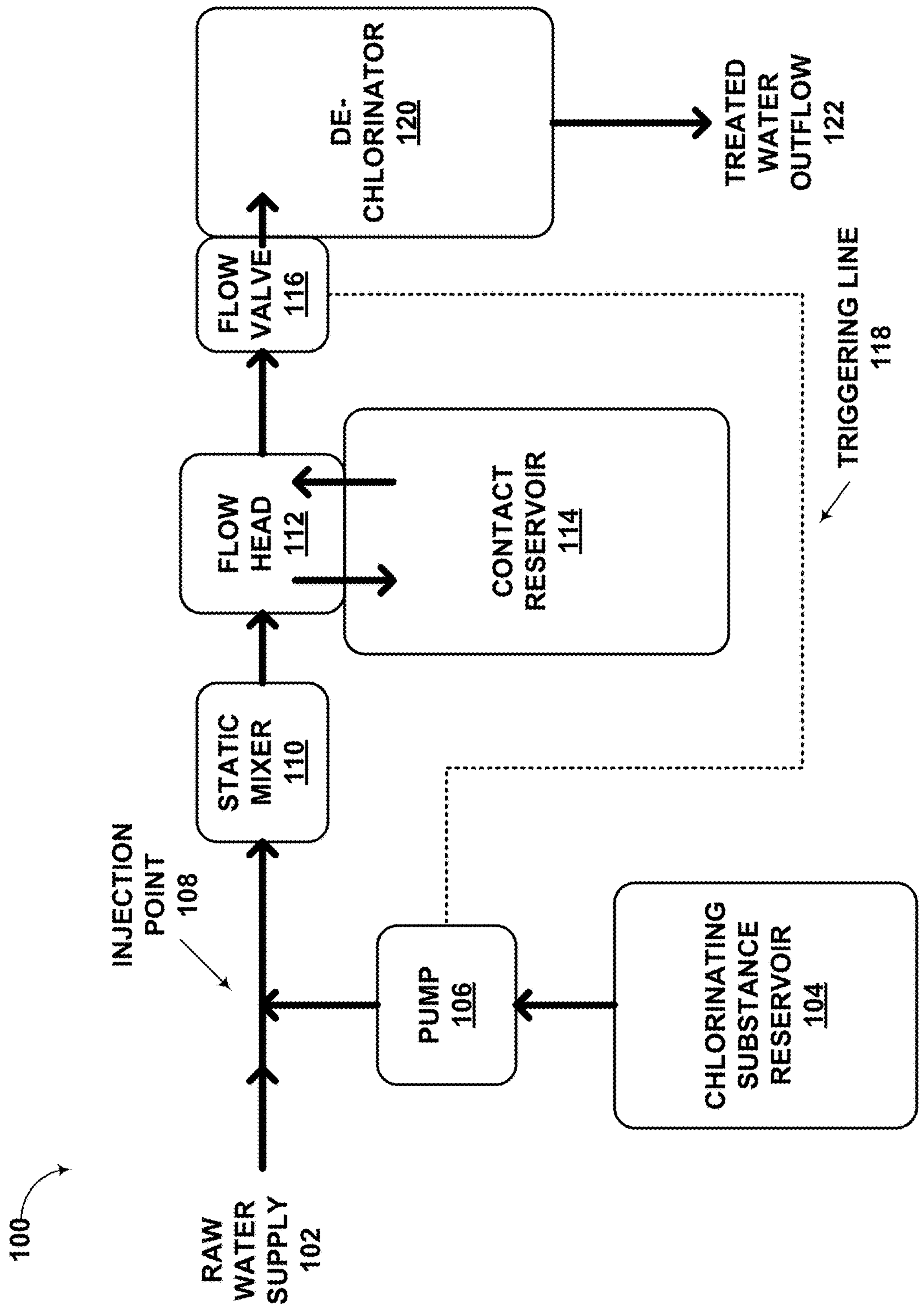
FIG. 1 depicts a water treatment system, in accordance with an example embodiment.

FIG. 1 depicts a system 100, in accordance with an example embodiment. FIG. 1 includes a number of piping units, depicted in broad, solid, lines with arrows indicating the direction of water flow. Thus, generally speaking, water may flow from raw water supply 102 to treated water outflow 122. The piping units may be pipe, or some other conduit capable of moving liquid from one point to another. For example, the piping units may be copper pipe, polyvinyl chloride (PVC) pipe, hoses, etc.

In FIG. 1, untreated water is received from raw water supply 102. Raw water supply 102 may be a well that provides ground water from an aquifer, or some other source of untreated water. For instance, raw water supply 102 may be a reservoir of untreated water, or a unit of piping that provides untreated water to system 100.

Chlorinating substance reservoir 104 may be a tank, an accumulator, or some other medium that is configured to contain a chlorinating substance. The chlorinating substance may be, for instance, sodium hypochlorite, calcium hypochlorite, hydrogen peroxide, or some other type of bleach or oxidizing agent.

Chlorinating substance reservoir 104 may provide the chlorinating substance to pump 106. Pump 106 may be any type of pump, such as a peristaltic pump, and may be configured to be either in an activated state or a deactivated state. When in the activated state, pump 106 may move the chlorinating substance from chlorinating substance reservoir 104 to injection point 108. When in the deactivated state, pump 106 may prevent or impede the movement of the chlorinating substance from chlorinating substance reservoir 104 to injection point 108. Pump 106 may be triggered to switch from the deactivated state to the activated state by any electrical mechanism, mechanical mechanism, optical mechanism, or via some other type of mechanism. Particularly, pump 106 may be triggered between the states by triggering line 118.

Injection point 108 may be a junction between the piping unit from raw water supply 102 and the piping unit from pump 106. Thus, when pump 106 is in the activated state, injection point may receive water from raw water supply 102 and the chlorinating substance from pump 106. However, when pump 106 is in the deactivated state, injection point 108 might only receive water from raw water supply 102. Regardless, injection point 108 may provide the received matter to static mixer 110. (In the following, it is assumed that pump 106 is in the activated state, and thereby providing the chlorinating substance into other parts of system 100, unless context indicates otherwise.)

Static mixer 110 may receive the water and the chlorinating substance, and mix the two together. To do so, static mixer 110 may create turbulence that combines the water and the chlorinating substance. In some embodiments, the static mixer may be combined with, mounted on, or otherwise integrated with contact reservoir 114. Static mixer 110 may provide the combined water and chlorinating substance (hereafter, "the solution") to flow head 112.

Flow head 112 may receive the solution and provide it into contact reservoir 114. In turn, contact reservoir 114 may allow for an extent of the solution to blend, thereby dispatching at least some of any bacteria that may be introduced by raw water supply 102. The chlorinating substance in the solution may further serve to neutralize organic substances from raw water supply 102. These neutralized organic substances may settle to the bottom and/or sides of contact reservoir 114, where they may be conveniently removed. In some embodiments, flow head 112 may be referred to as a reverse flow head.

Contact reservoir 114 may be a tank, an accumulator, or some other medium that is configured to contain the solution. Further, contact reservoir 114 may include a spin-down function that acts as or similarly to that of a centrifuge. Thus, this function may serve to efficiently separate the neutralized organic substances from the solution.

In some embodiments not shown in FIG. 1, static mixer 110 may be located inside of, or otherwise combined with, contact reservoir 114. In these scenarios, flow head 112 may push untreated water and the chlorinating substance through static mixer 110 into contact reservoir 114.

Regardless, flow head 112 may also receive the solution from contact reservoir 114, and provide the received solution to flow valve 116. In normal operation, the received solution will have had some, most, or all of its bacteria dispatched, and some, most, or all of the other organic substances removed.

Flow valve 116 may receive the solution from flow head 112 and provide the solution to de-chlorinator 120. Additionally, flow valve 116 may be configured to be able to detect when water is flowing through system 100. For instance, in normal residential use, raw water supply 102 provides pressurized water throughout system 100, and to the residence's plumbing system via treated water outflow 122. Therefore, when all faucets and other devices that draw water through system 100 are turned off, there may be no flow through system 100. Consequently, in this case, there may also be no flow through flow valve 116. However, when one of these faucets or other devices (e.g., a sink faucet, a shower faucet, a dishwasher, a washing machine, etc.) is turned on, then water will flow through system 100, including flow valve 116.

Flow valve 116 may be configured detect changes in water pressure or to detect water flow in some other way. Regardless, when flow valve 116 detects water flow, flow valve 116 may use triggering line 118 to trigger pump 106 to switch from the deactivated state to the activated state. Similarly, when flow valve 116 detects that the water flow has stopped, flow valve 116 may use triggering line 118 to trigger pump 106 to switch from the activated state to the deactivated state.

Triggering line 118 may include electrical wire, optical fiber, network cable, or some other medium that transports one or more types of signals between flow valve 116 and pump 106. Alternatively, triggering line 118 may be mechanical, and may serve to mechanically switch pump 106 between states.

De-chlorinator 120 may receive the solution from flow valve 116 and separate the chlorinating substance from the water. For example, de-chlorinator 120 may be a charcoal filter, or some other mechanism. De-chlorinator 120 may provide this treated water to treated water outflow 112.

Treated water outflow 122 may represent an indoor or outdoor plumbing system. For instance, as noted above, treated water outflow 122 may provide treated water to faucets and other devices in a residence, small business, etc.

It should be understood that system 100 may be rearranged in various ways. For instance, some components may be placed in different locations relative to other components, and/or may be connected in different arrangements. Further, the functionality of some components may be combined with that of other components.

As an example, flow valve 116 may be located between static mixer 110 and flow head 112, between injection point 108 and static mixer 110, after de-chlorinator 120, or closer to raw water supply 102. Alternatively, flow valve 116 may be coupled to de-chlorinator 120. In some embodiments, static mixer 110 may be integrated with contact reservoir 114 and/or pump 106 may be integrated with contact reservoir 114.

Figure 3:
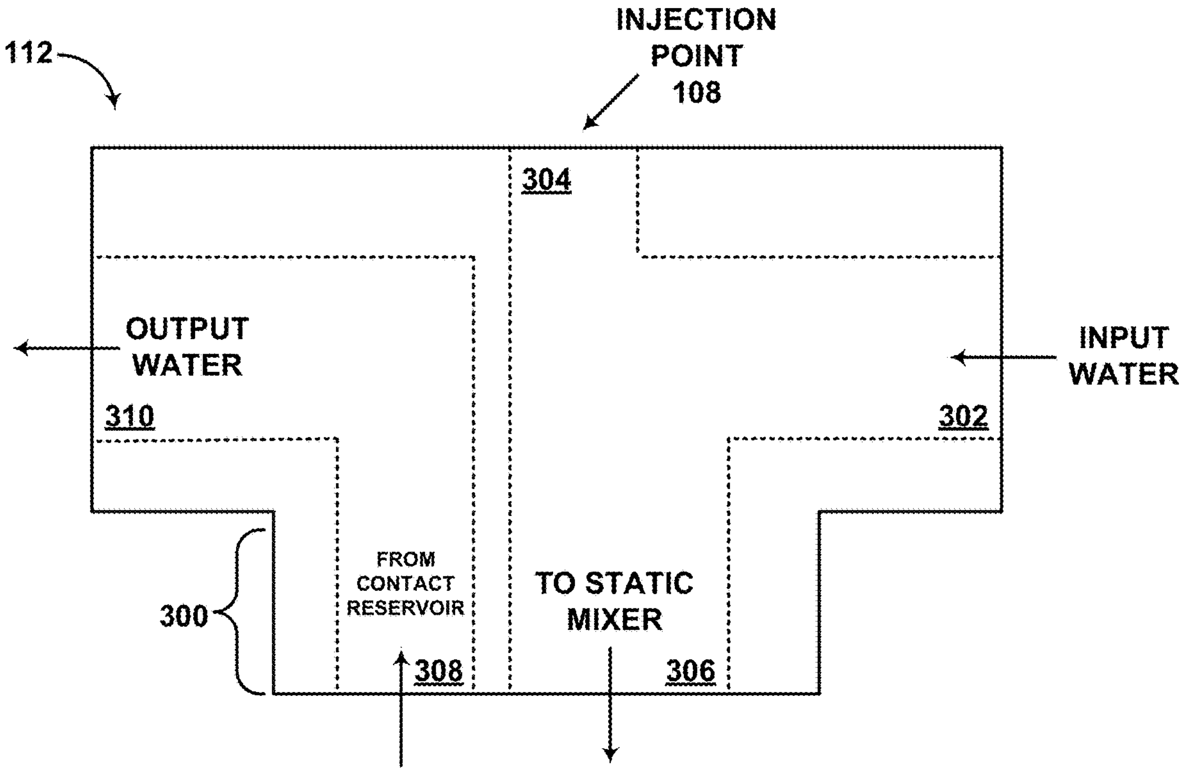
FIG. 3 depicts a flow head, in accordance with an example embodiment.

Alternatively, and as described further in the context of FIG. 3, the top of flow head 112 may include or be coupled to injection point 108, and the bottom of flow head 112 may be coupled to static mixer 110.

Figure 2:
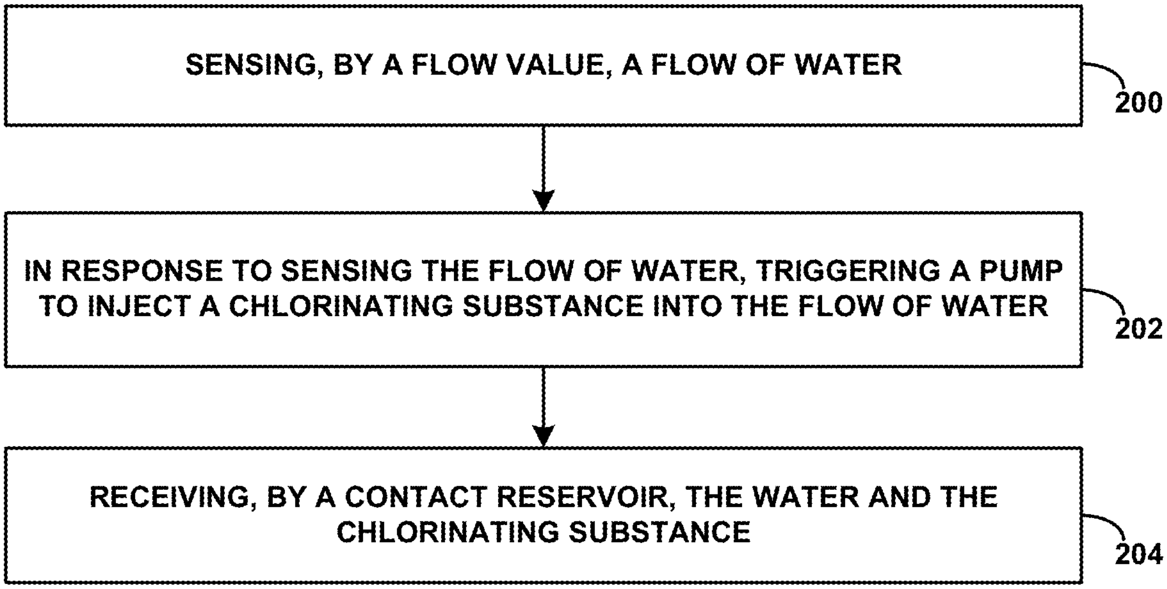
FIG. 2 is a flow chart, in accordance with an example embodiment.

FIG. 2 depicts a method according to an example embodiment. At block 200, a flow of water may be sensed by a flow valve. At block 202, in response to sensing the flow of water, the flow valve may trigger a pump to inject a chlorinating substance into the flow of water. At step 204, a contact reservoir may receive the water and the chlorinating substance.

In some embodiments, the chlorinated flow of water may be received from the contact reservoir, and the chlorinated water may be de-chlorinated. De-chlorinating the chlorinated water may occur in a de-chlorinator, and the flow valve may be coupled to the de-chlorinator. Further, the water may be drawn from an untreated, or raw, water supply, and the de-chlorinator may provide treated water.

Alternatively or additionally, the pump may be configured to draw the chlorinating substance from a chlorinating substance reservoir. In some cases, a static mixer may be configured to combine the water and the injected chlorinating substance prior to, or in conjunction with, the water entering the contact reservoir. The static mixer may be integrated with the contact reservoir, and the pump may also be integrated with the contact reservoir.

The pump may be connected by a first unit of piping to the contact reservoir, and the contact reservoir may be connected by a second unit of piping to the flow valve. A flow head may be coupled to the contact reservoir. The flow head may include an input water port and an output water port. The input water port may be coupled to the first unit of piping, and the output water port may be coupled to the second unit of piping.

This system and process of injecting the solution into a water supply provides significantly safer and cleaner water than many other filter system technologies. Other technologies may focus on the elimination of bacteria from the filter material rather than from the water supply. As a result, other technologies may allow bacteria-riddled water to exist within the plumbing distribution system, where the bacteria have an opportunity to grow. The disclosed system and process kills bacteria in the water supply, while eliminating nuisance odors and oxidizing particles from the water. Then, excess amounts of the chlorinating substance are removed, which provides improved quality water. The process of killing bacteria is accurately achieved using a flow valve. The flow valve provides a precise dosing of the chlorinating substance to water while water is being used.

FIG. 3 depicts a side view of flow head 112 in accordance with an example embodiment. In some arrangements, the bottom section 300 of flow head 112 may be coupled with static mixer 110. This coupling may be based on a slideable attachment, a screwable attachment, a welded attachment, or some other form of attachment. The top of flow head 112 may serve as injection point 108, or may be coupled to injection point 108.

Flow head 112 may receive untreated input water via right-hand port 302, and a chlorinating substance via top port 304 (which may be integrated with or coupled to injection point 108). This water and chlorinating substance may be pushed down and out of flow head 112 via right-hand, bottom port 306 into static mixer 110.

Via the left-hand, bottom port 308, flow head 112 may receive a solution from contact reservoir 114. The solution may include a mixture of the water and the chlorinating substance. The solution may have passed through a diffuser in contact reservoir 114. The solution may be pushed out of flow head 112 via output port 310.

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:

a pump, fluidly coupled within a system of piping, selectively injecting a chlorinating substance into the system of piping from a chlorinating substance reservoir;

a contact reservoir, coupled to the system of piping, receiving water and the chlorinating substance from the pump, and combining the water and the chlorinating substance; and a flow valve, disposed within the system of piping downstream from and coupled to the pump, sensing a flow of the water through the system of piping and fluidly coupled to an output; and in response to sensing the flow of the water, transmitting to the pump a control signal that remotely triggers the pump to inject the chlorinating substance into the system of piping.

2. The system of claim 1, further comprising:

a de-chlorinator configured to receive a solution of the water and the chlorinating substance from the contact reservoir, and configured to separate the chlorinating substance from the solution to provide treated water.

3. The system of claim 2, wherein the flow valve is coupled to the de-chlorinator.

4. The system of claim 2, wherein the water received by the contact reservoir is drawn from an untreated water supply.

5. The system of claim 2, wherein the flow valve is positioned downstream from the de-chlorinator, and wherein the flow of the treated water passes through the flow valve.

6. The system of claim 1, wherein the pump is further configured to draw the chlorinating substance from a chlorinating substance reservoir.

7. The system of claim 1, further comprising:

a static mixer configured to combine the water and the chlorinating substance prior to the water entering the contact reservoir.

8. The system of claim 7, wherein the static mixer is integrated with the contact reservoir.

9. The system of claim 7, wherein the pump is integrated with the contact reservoir.

10. The system of claim 1, further comprising:

a static mixer in fluid communication with the contact reservoir and configured to combine the water and the chlorinating substance, and wherein the contact reservoir is a tank containing a spin-down component that separates organic substances from the water and the chlorinating substance.

11. The system of claim 1, wherein the pump is connected by a unit of piping to the contact reservoir, and wherein the contact reservoir is connected by a second unit of piping to the flow valve.

12. The system of claim 11, further comprising:

a flow head coupled to the contact reservoir, wherein the flow head comprises an input port and an output port, wherein the input port is coupled to the unit of piping, and wherein the output port is coupled to the second unit of piping.

13. The system of claim 1, wherein the chlorinating substance is hydrogen peroxide.

14. The system of claim 1, wherein the chlorinating substance is an oxidizing agent.

15. The system of claim 1, wherein the flow valve is configured to sense the flow by detecting a change in pressure at the flow valve.

16. A water treatment system including an input for a raw supply, and an output, the water treatment system comprising:

a pump in fluid communication with the input to selectively inject a chlorinating substance into the raw supply;

a contact reservoir in fluid communication with the input to receive the raw supply and the chlorinating substance, and wherein the raw supply and the chlorinating substance are combined within the contact reservoir; and a flow valve disposed downstream of the pump and in fluid communication with the output, wherein the flow valve senses a flow based on fluid communication with the output; and in response to sensing the flow, transmit a control signal to trigger the pump to inject the chlorinating substance.

17. The water treatment system of claim 16, further comprising:

a de-chlorinator configured to receive a solution of the raw supply and the chlorinating substance from the contact reservoir, and configured to separate the chlorinating substance from the solution to provide a treated water supply to the output.

18. The water treatment system of claim 17, wherein the flow valve is coupled to the de-chlorinator.

19. The water treatment system of claim 17, wherein the raw supply received by the contact reservoir is drawn from an untreated water supply.

20. The water treatment system of claim 17, wherein the flow valve is positioned downstream from the de-chlorinator.

* * * * *